US006551630B2

(12) United States Patent
Patel et al.

(10) Patent No.: US 6,551,630 B2
(45) Date of Patent: Apr. 22, 2003

(54) GENERA *PRUNUS* ENDOCARP DIETARY SUPPLEMENT

(75) Inventors: Dinesh Patel, Tucson, AZ (US); Robert S. Green, Tucson, AZ (US)

(73) Assignee: Integrated Biomolecule Corp., Tucson, AZ (US)

( * ) Notice: Subject to any disclaimer, the term of this patent is extended or adjusted under 35 U.S.C. 154(b) by 0 days.

(21) Appl. No.: 10/041,269

(22) Filed: Jan. 8, 2002

(65) Prior Publication Data

US 2002/0054925 A1 May 9, 2002

Related U.S. Application Data

(62) Division of application No. 09/352,190, filed on Jul. 12, 1999, now Pat. No. 6,355,250.
(60) Provisional application No. 60/092,496, filed on Jul. 13, 1998.

(51) Int. Cl.$^7$ .......................... A61K 35/78; A61K 9/48; A61K 9/14; A61K 31/70; A61K 47/00
(52) U.S. Cl. ..................... 424/735; 424/451; 424/464; 424/489; 424/439; 514/23; 514/182; 514/456
(58) Field of Search ............................. 424/195.1, 451, 424/464, 489, 735, 439; 514/182, 23, 456

(56) References Cited

U.S. PATENT DOCUMENTS

| 4,119,740 A | | 10/1978 | Crespo | 426/631 |
|---|---|---|---|---|
| 4,997,489 A | | 3/1991 | Rabinowitz | 127/43 |
| 5,480,788 A | * | 1/1996 | Devic | 435/168 |
| 6,025,348 A | * | 2/2000 | Goto et al. | 514/182 |

OTHER PUBLICATIONS

Wang et al. Antioxidant Polyphenols from Tart Cherries: 1999 vol. 47, P 840–844 J. Agric. Food Chem.
Butterwick et al. "Effect of Level and Source of Dietary Fiber . . . " 1994 , vol. 124 The Journal of Nutrition pp. 26955–26705.
Santa Pazeres "Medicament for treating bronchial asthma . . . " 1995 Derwent Information Ltd. 1995–061283.
Food Chemistry, 1995, vol. 52, No. 2, pp. 143–148, abstract of article entitled: "Changes in Chemical–Composition, Nutritional Quality, Physicochemical and Functional–Properties of Peach Kernel Meal During Detoxification".
Nahrung–Food, 1994, vol. 38, No. 1, pp. 12–20, abstract of article entitled: "Biochemical–Studies of Some Nonconventional Sources of Proteins .7. Effect of Detoxification Treatments on the Nutritional Quality of Apricot Kernels".
Tables from CRC Handbook of Physics and Chemistry (1968 edition).
Revista Chilena De Historia Natural, 1997, vol. 70, No. 1, pp. 67–71, abstract of article entitled: "Diet selection in rodents: An experimental test of the effect of dietary fiber and tannins on feeding behavior".

Physiological Zoology, 1997, vol. 70, No. 3, pp. 270–277, abstract of article entitled: "Effects of tannins on digestion and detoxification activity in gray squirrels".
Physiological Zoology, 1997, vol. 70, No. 2, pp. 175–180, abstract of article entitled: "Effects of tannins of galliform cecal partitioning".
Cancer Letters, 1997, vol. 113, No. 1–2, pp. 39–46, abstract of article entitled: "Effects of n–tritiacontane–16, 18–dione, curcumin, chlorophyllin, dihydroguaiaretic acid, tannic acid and phytic acid on the initiation stage in a rat myti–organ carcinogenesis model".
Journal of Photochemistry and Photobiology B–Biology, 1995, vol. 30, No. 2–3, pp. 97–103, abstract of article entitled: "Protection of Plasmid PBR322 DNA by Flavonoids Against Single–Strand Breaks Induced by Singlet Molecular–Oxygen".
Journal of the Science of Food and Agriculture, 1995, vol. 68, No. 1, pp. 65–71, abstract of article entitled: "Acacia Saligna as a Fodder Tree for Desert Livestock and the Interaction of its Tannins with Fiber Fractions".
Phytotherapy Research, 1994, vol. 8, No. 5, pp. 293–296, abstract of article entitled "Inhibition of Tumor Promotion and Cell=Proliferation by Plany Polyphenols".
Cancer Letters, 1994, vol. 83, No. 1–2, pp. 149–156, abstract of article entitled: "Inhibition Or Mammary–Gland Carcinogenesis by Green Tea Catechins And Other Naturally–Occurring Antioxidants in Female Sprague–Dawley Rats Pretreated With 7,12–Dimethylbenz[A]Anthracene".
Journal of Agricultural And Food Chemistry, 1994, vo. 42, No. 7, pp. 1481–1487, abstract of article entitled: "Polyphenols As Dietary Fiber Associated Compounds—Comparative–Study On In–Vivo and In–Vitro Properties".
British Journal Of Nutrition, 1994, vol. 71, No. 6, pp. 993–946, abstract of article entitled: "Degradation of Polyphenols (Catechin and Tannic–Acid) in The Rat Intestinal–Tract—Effect on Colonic Fermentation and Fecal Output".
ACS Symposium Series, 1994, vol. 547, pp. 122–132, abstract of article entitled: "Cancer Chemoprevention by Antioxidants".
Journal of Nutrition, 1998, vol. 128, No. 2, pp. 175–179, abstract of article entitled: "Increases in the concentrations of available iron in response to dietary iron supplementation are associated with changes in crype cell proliferation in rat large intestines".
Food and Chemical Toxicology, 1998, vol. 36, No. 1, pp. 7–12, abstract of article entitled: "Effect of microbial phytase on zinc bioavailability and cadmium and lead accumulation in growing rats".

(List continued on next page.)

Primary Examiner—Russell Travers
Assistant Examiner—Shengjun Wang
(74) Attorney, Agent, or Firm—Greer, Burns & Crain, Ltd.

(57) ABSTRACT

A dietary supplement product comprises an endocarp of the genera Prunus in ingestible form The endocarp has been lyophilized to remove hydrocyanic acid to a safely ingestible level.

18 Claims, No Drawings

OTHER PUBLICATIONS

Nahrung–Food, 1997, vol. 41, No. 5, pp. 311–314, abstract of article entitled: "Influence of vegetarian and mixed nutrition on selected haematological and biochemical parameters in children".

Carcinogenesis, 1997, vol. 18, No. 10, pp. 2023–2026, abstract of article entitled: "Interactive suppression of aberrant crype foci induced by azoxymethane in rat colon by phytic acid and green tea".

Archives Of Animal Nutritioin–Archiv Fur Tieremahrung, 1997, vol. 50, No. 4, pp. 301–319, abstract of article entitled: "Nutritional significance of phytic acid and phytase".

Anticancer Reseach, 1996, vol. 16, No. 6A, pp. 3287–3292, abstract of article entitled: "Novel anticancer functions of IP {s: Growth inhibition and differentiation of human mammary cancer cell lines in vitro".

Nutrition Research, 1996, vol. 16, No. 3, pp. 413–426, abstract of article entitled: "Diet and Experimental Colorectal–Cancer".

Journal of Nutrition, 1995, vol. 125, No. 3 SS, pp.S 581–S 588, abstract of article entitled: "Compositional Changes in Trypsin–Inhibitors, Phytic Acid, Saponins And Isoflavones Related to Soybean Processing".

Journal of Nutrition, 1995, vol. 125, No. 3 SS, pp.S 606–S 611, abstract of article entitled: "Overview of Proposed Mechanisms for the Hypocholesterolemic Effect of Soy".

Critical Reviews in Food Science and Nutrition, 1994, vol. 24, No. 5–6, pp. 473–497, abstract of article entitled: "Antioxidants and Hormone–Medicated Health Benefits of Whole Grains".

Article entitled: "What is Freeze Drying?" Lyophilization overview.

* cited by examiner

GENERA *PRUNUS* ENDOCARP DIETARY SUPPLEMENT

CROSS REFERENCE TO RELATED APPLICATIONS

This application is a divisional application from application Ser. No. 09/352,190 filed Jul. 12, 1999, now U.S. Pat. No. 6,355,250, which application claims the benefit of U.S. Provisional Application No. 60/092,496 filed Jul. 13, 1998.

BACKGROUND OF THE INVENTION

1. Field of the Invention

The present invention relates generally to the use of genera Prunus endocarp as a dietary supplement product for mammals, to a method for producing the product, to the product produced by the method, and to the method of using the product.

More specifically, the dietary supplement is produced from a natural source from which a host of chemical compounds having beneficial properties, as will be described hereinbelow, can be obtained. Also defined hereinbelow is a method for processing this source in a manner which preserves these chemicals and renders the source ingestible.

2. Description of the Prior Art

Much research has been done on the effect of various organic chemical compounds on mammalian bodily function. It is common knowledge that the addition of certain chemical compounds can have beneficial effects. For example, expansive amounts of literature report that phytochemicals of the general class of (a) tannins, (b) phytic acids, (c) phytosterols and (d) flavanoids/isoflavones have (i) astringent properties and (ii) micellar disruption capabilities. As such, they can be used to affect the absorption of fats. Certain of these phytochemicals have also been reported as having ancillary anti-cancer/cancer preventative, hypocholesterolemic, antihepatotoxic and immunostimulant properties as well. Unfortunately, it can be difficult to introduce these compounds into the diet. Synthetic versions of these compounds can be costly as well as unappealing to those who prefer natural products. In addition, even if these compounds can be found naturally in multiple natural sources, there is a practical limit to the number of supplements individuals can reasonably be expected to take. There is therefore a need in the art for a product which provides a multiplicity of such beneficial compounds. Ideally this product would be natural, inexpensive to acquire and process, and easily ingested.

It is common knowledge that a large segment of society is overweight. Some have attributed this to a less physically active lifestyle in this modern era; a sedentary lifestyle tends to result in weight gain. Others have blamed consumption of foods with high fat content. Studies have shown that people of excessive weight tend to have a higher incidence of certain health problems. In addition to health risks, society finds excess weight to be aesthetically unappealing.

As a result, significant efforts have been directed at finding methods to enable people to lose weight. This has resulted in diet programs under which participants reduce their caloric intake in general and in relation to specific foods which tend to result in increased weight as well as resulting in creation of numerous exercise programs designed to burn calories. In addition, sugar and fat substitutes have been introduced as another way to reduce caloric intake. While some of these efforts may help, they generally prove ineffective for most of the population. Diet and exercise programs are difficult to follow, and many take a dim view with regard to such sugar and fat substitutes.

A high fat intake diet associated with an inability to match that intake with the expenditure of the consumed fat derived calories is known to be correlated with obesity. It is understood that the body tends to store excess absorbed fat for future use rather than eliminate it, and it is this factor which tends to lead to weight gain. Unfortunately, fats make many food products appealing and this leads to excessive fat consumption. There is therefore a need in the art for a product which reduces the body's absorption of fats. Ideally this product would be natural and easily ingested. The present invention is designed to satisfy this and other needs.

Absorption of fats from the diet in the gut is regulated by gastric secretions from the bile duct. Absorption of the various types of fats typically found in the human diet is controlled by the release of triglyceride digesting esterases which are released from the gallbladder via the bile duct into the upper duodenum. Once in the digestive tract, these esterases hydrolyze the fatty acid chains from the triglycerides, freeing the fatty acids causing the formation of fat micells and consequently allowing fat absorption to take place.

The absorption of the free fatty acids from the lumen of the small intestine is achieved through a process of emulsification/micellization with bile salts in the crypts between the microvilli that cover the lumen of the intestine. These created micelles are capable of being absorbed across the cells defining the lumen via a pinocytotic process and into the underlying capillaries that drain into the hepatic portal vein. This diffusion is controlled by the diffusion potential across the brush border of epithelial cells of the micro-villi and the presence of chemical compounds with astringent and/or micellar disruption capabilities that reduce the absorption of fats.

Volumes of literature report that phytochemicals of the general classes of (a) tannins, (b) phytic acids, (c) phytosterols and (d) flavanoids/isoflavones have (i) astringent properties and (ii) micellar disruption capabilities. As such, they can be used to effectively reduce the absorption of fats. Certain of these phytochemicals are also known to have anti-cancer/cancer preventative, hypocholesterolemic, antihepatotoxic and immunostimulant properties.

Endocarp preparations from the genera Prunus have been shown to be rich in the phytochemicals referred to above. Absent in the literature, however, is any suggestion of the use of genera Prunus endocarp or portions thereof as a dietary supplement in reducing significantly the absorption of the intake of fats. It is well known that the endocarp of the genera Prunus includes an undesirable compound, hydrocyanic acid. Ideally, this hydrocyanic acid should be removed before genera Prunus endocarp is ingested.

SUMMARY OF THE INVENTION

According to the invention there is provided a dietary supplement comprising an endocarp of the genera Prunus in ingestible form.

Further according to the invention there is provided a method for using a dietary supplement comprising an endocarp of the genera Prunus including the step of ingesting a sufficient amount of the supplement to reduce the body's absorption of fat.

Still further according to the invention there is provided a method for producing a dietary supplement comprising the steps of obtaining a fresh endocarp of the genera Prunus, freezing the obtained structure prior to placing same in a suitable vacuum vessel, connecting the vacuum vessel to a lyophilizer, creating a pressure drop in the vessel to a suitable vacuum level, maintaining the vacuum level for a predetermined duration, returning atmospheric pressure into the vessel, removing the lyophilized structure from within the vessel, and pulverizing the structure into particles of predetermined size.

Yet further according to the invention there is provided a product made by the method of the present invention.

DESCRIPTION OF THE PREFERRED EMBODIMENT

Summarily, when one eats a "normal meal", one consumes carbohydrates, proteins and fats. Since fats contain more than twice as many calories per gram as do proteins and carbohydrates (9 calories per gram of fats versus about 4 calories per gram of carbohydrates or proteins) reducing fats absorption is crucial to reducing body weight.

Reduction in fat absorption will inherently reduce caloric intake. When the caloric intake reaches a deficit level with respect to caloric requirements, the body compensates by drawing on reserves, primarily in the form of stored fats, to balance the deficit.

Reduction in fat absorption can be accomplished by providing a supplement with astringent and/or micellar disruption properties which interfere with the body's absorption of fat.

To that end, the disclosure herein addresses the use, the product and process or method for making such a dietary supplement product from the endocarp of species or subspecies of the genera Prunus, while gaining the advantages of the supply of other phytochemicals naturally occurring therein as defined above.

The example to be disclosed hereinbelow relates to *Prunus persica,* though this should not be construed as limiting.

Beginning with the process, it will be understood to begin with a freshly removed endocarp as spoilage is a primary consideration with regard to the active chemical compounds therein. Further, consideration must be given to preservation of the endocarp without deactivating the desired compounds as well.

Still further, it will be understood that the endocarp is typically a large and woody structure which cannot be ingested in its natural state. Thus a conversion of form must be accomplished as well. To these ends, the following process has been developed.

The exterior of a fresh endocarp is washed thoroughly in de-ionized water, and then dried by any suitable means, such as by being allowed to drip dry. Once dry, the endocarp is individually frozen at a temperature below minus 20° C. After freezing, a plurality of endocarps are placed together in a suitable vacuum vessel connected to a lyophilizer and a valve to a vacuum chamber is opened until the pressure in the vessel falls to below 100 millitorr (0.1 mm Hg).

This vacuum is maintained for at least 10 or so hours, at ambient temperature. The valve to the vacuum chamber is then closed with atmospheric pressure being re-admitted to the vacuum vessel.

The lyophilized endocarps are then removed and pulverized to a desired particle size, dependent upon which of a plurality of forms the supplement is to take, such as, for example, a fluid, a hot or cold infusion, a powder, a tablet, and/or a capsule, in deference to user preference.

Further, there is also nothing to preclude use of the product yielded by other mammals such as horses, dogs, etc.

It is known that the endocarp of the genera Prunus includes an undesirable compound, hydrocyanic acid, therein which preferably is absent in the product yielded by the process.

This acid constituent is inherently eliminated by practice of the process. In this respect, hydrocyanic acid at normal pressure (atmospheric) has a boiling point of 25.7C. Thus at temperatures above 25.7C. hydrocyanic acid becomes a vapor, easily escaping from the endocarp.

Further, at a pressure of 1 mm Hg ($\frac{1}{760}$th atmospheric pressure, atmospheric pressure being 760 mm) for hydrocyanic acid to remain in a solid or liquid state the temperature must be below −71.0C. Inasmuch as the lyophilization occurs at ambient (room) temperature (20–25C) all hydrocyanic acid present in the vacuum vessel is therefore in a gas phase and is removed by the vacuum conditions existing in the vessel.

It will be understood that the endocarp is comprised of an outer portion and an inner portion. The teachings herein therefore incorporate the use of the inner portion individually as well as the outer portion individually.

Thus, the method of use and the method of producing an ingestible product must necessarily incorporate the use of these structures individually and in combination and it is not believed that such individual use or processing would detract from the supplemental benefits obtained when the entire endocarp is utilized.

Further, confirming the above a product produced from only one of these structures is also taught herein without compromising supplemental efficacy.

In a preliminary study, twelve healthy volunteers (six male, six female) between the ages of twenty-five and fifty, with body weights within the range of 125 lb. to 205 lb. were selected as candidates to evaluate the effect of the product upon dietary fat absorption by monitoring for an attendant weight reduction.

All candidates were consuming non-restricted diets ad libitum prior to and during the period of the study. Typical diets consisted of regular food stuffs as recommended by average dietary guidelines accepted by the American Medical Association. Total caloric intake was considered 'normal' for the activities performed by the candidates, ranging from 1800–2800 calories per day, as estimated by the candidates. With some candidates certain meals were considered to be 'low fat', however no strict global regime of 'low fat' intake was determined in any candidate's diet.

For the purposes of comparison, each candidate noted information about their eating habits and levels of perceived hunger/fullness prior to and following product supplementation. Similarly noted was information about the candidate's bowel movements; specifically, regularity, ease, texture, volume, appearance and odor.

The product was administered as a 200-mg capsule one or two times per day, and ideally 1 hour prior to ingesting a large meal; in most cases, this was lunch or dinner. On several occasions the doses were taken immediately before a meal due to unavoidable circumstances.

In all cases after a short loading period (2–5 days) candidates noted 'looser' bowel movements that were of increased volume. Other observations of the stools suggested a lighter color and a stronger odor, both suggestive of 'white stools' that are indicative of high fat content.

Reports of measurable weight loss were reported after 6–10 days, and were on the order of 3–8 lb. Over the course of the four week study all candidates reported a significantly measurable weight loss, the greatest weight loss reported being 20 lb.

All candidates reported no adverse side effects or health problems, and several were pleased with the changes effected with regard to bowel movements. Several candidates reported a general overall feeling of healthiness as manifested by improvements in skin texture, nail bed health, and hair quality (strength and sheen).

As described above, the subject matter presented herein will be seen to provide a number of advantages, some of which are described above and others of which are inherent in the invention. Also, modifications may be proposed without departing from the teachings herein. Accordingly, the scope of the invention is only to be limited as necessitated by the accompanying claims.

We claim:

1. A dietary supplement for reducing absorption of fat ingested by the body comprising an endocarp of the genera Prunus having naturally occurring phytochemicals and hydrocyanic acid, wherein hydrocyanic acid has been removed from said endocarp to a safely ingestible level while preserving said phytochemicals.

2. A dietary supplement as in claim 1 comprising tannins in ingestible form.

3. A dietary supplement as in claim 1 comprising phytic acids in ingestible form.

4. A dietary supplement as in claim 1 comprising phytosterols in ingestible form.

5. A dietary supplement as in claim 1 comprising flavonoids in ingestible form.

6. A dietary supplement as in claim 1 comprising isoflavones in ingestible form.

7. A dietary supplement as in claim 1 wherein said endocarp comprises only an outer portion of the endocarp of the genera Prunus in ingestible form.

8. A dietary supplement as in claim 1 wherein said endocarp comprises only an inner portion of the endocarp of the genera Prunus in ingestible form.

9. A dietary supplement product of the process comprising providing an endocarp of the genera Prunus said endocarp having a hydrocyanic acid level, and lyophilizing said endocarp to reduce said hydrocyanic level to between zero and a safely ingestible level.

10. A dietary supplement as in claim 9, wherein said endocarp is pulverized.

11. A dietary supplement as in claim 9, wherein the supplement is in a form selected from the group of a liquid, a hot infusion, a cold infusion, a powder, a tablet, and a capsule.

12. A dietary supplement as in claim 9, wherein said endocarp is pulverized and formed into tablets of a selected dosage.

13. A dietary supplement as in claim 9, wherein said endocarp is pulverized and formed into capsules of a selected dosage.

14. A dietary supplement as in claim 9, further comprising dietary supplements in addition to said endocarp of the genera Prunus.

15. A dietary supplement as in claim 9, said endocarp comprising phytochemicals.

16. A dietary supplement as in claim 9, wherein said endocarp was lyophilized at vacuum level of less than about 0.1 mm Hg for a duration of at least 10 hours.

17. A dietary supplement as in claim 9, wherein said endocarp of the genera Prunus is of the species *persica*.

18. A dietary supplement for reducing fat absorption comprising an endocarp of *Prunus persica* that has been frozen to a temperature of −20° C. or below, and lyophilized under a vacuum of 0.1 mm Hg or lower, for a duration of at least ten hours at ambient temperature.

* * * * *